(12) United States Patent
Uchiyama et al.

(10) Patent No.: US 9,370,039 B2
(45) Date of Patent: Jun. 14, 2016

(54) RADIO BASE STATION AND METHOD

(75) Inventors: Tadashi Uchiyama, Miura (JP);
Kazunori Obata, Yokosuka (JP);
Masafumi Masuda, Yokosuka (JP);
Seigo Harano, Yokohama (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 13/279,681

(22) Filed: Oct. 24, 2011

(65) Prior Publication Data

US 2012/0108197 A1 May 3, 2012

(30) Foreign Application Priority Data

Oct. 29, 2010 (JP) ................................. 2010-244078

(51) Int. Cl.
| | | |
|---|---|---|
| *H04M 11/04* | (2006.01) | |
| *H04W 76/06* | (2009.01) | |
| *H04W 36/00* | (2009.01) | |
| *H04W 4/00* | (2009.01) | |
| *H04L 12/66* | (2006.01) | |
| *H04W 88/06* | (2009.01) | |
| *H04W 88/08* | (2009.01) | |

(52) U.S. Cl.
CPC .............. *H04W 76/06* (2013.01); *H04W 36/00* (2013.01); *H04W 88/06* (2013.01); *H04W 88/08* (2013.01)

(58) Field of Classification Search
USPC ................ 455/404.1, 436; 370/331, 356, 352
See application file for complete search history.

(56) References Cited

U.S. PATENT DOCUMENTS

| | | | | |
|---|---|---|---|---|
| 8,165,608 | B2* | 4/2012 | Wang et al. .................... | 455/458 |
| 2010/0113010 | A1* | 5/2010 | Tenny et al. ................... | 455/423 |
| 2010/0172301 | A1* | 7/2010 | Watfa et al. .................... | 370/328 |
| 2010/0279677 | A1* | 11/2010 | Dwyer et al. ............... | 455/422.1 |
| 2010/0297979 | A1* | 11/2010 | Watfa et al. ................. | 455/404.1 |
| 2011/0014919 | A1* | 1/2011 | Otte et al. ...................... | 455/442 |
| 2011/0268083 | A1* | 11/2011 | Ostrup et al. .................. | 370/331 |

(Continued)

FOREIGN PATENT DOCUMENTS

| | | |
|---|---|---|
| CA | 2 734 263 A1 | 11/2009 |
| JP | 2010-178209 | 8/2010 |
| WO | WO 2010/080802 A1 | 7/2010 |

OTHER PUBLICATIONS

3GPP TSG-SA WG2 Meeting #73 Tallinn, Estonia, May 11-15, 2009, S2-094007.*

(Continued)

*Primary Examiner* — Muthuswamy Manoharan
(74) *Attorney, Agent, or Firm* — Oblon, McClelland, Maier & Neustadt, L.L.P.

(57) ABSTRACT

A radio base station in a first mobile communication system is disclosed. The radio base station includes a radio communication unit; a network communication unit; and a determining unit. If a massage received by the network communication unit from a switching station indicates that a mobile station is requesting a service which is not provided in the first mobile communication system but which is provided in, a second mobile communication system and it is determined by the determining unit that a handover to the second mobile communication system cannot be conducted, the network communication unit requests the switching station to release a connection with the mobile station. Then the radio communication unit reports to the mobile station that the connection should be released in accordance with an instruction from the switching station.

7 Claims, 6 Drawing Sheets

(56) References Cited

U.S. PATENT DOCUMENTS

2011/0274038 A1* 11/2011 Zhu et al. .................. 370/328
2012/0113982 A1* 5/2012 Akselin et al. ............. 370/355

OTHER PUBLICATIONS

"3rd Generation Partnership Project; Technical Specification Group Services and System Aspects; Circuit Switched (CS) fallback in Evolved Packet System (EPS); Stage 2 (Release 10)", 3GPP TS 23.272 V10.0.0 (Jun. 2010) *Technical Specification*, Jun. 2010, 73 Pages.

Japanese Office Action issued Oct. 23, 2012, in Japan Patent Application No. 2010-244078 (with English translation).

"Reply LS on outstanding NAS messages from RAN2 and CT1 [(S3-080452 (R2-082036) and S3-080461 (C1-081386)]" 3GPP TSG RAN WG2 Metting #62, R2-082099, 3GPP TSG SA WG3 Security—S3#51, (S3-080525), 2008, 6 pages (http://www.3gpp.org/ftp/tsg_sa/WG2_Arch/TSGS2_64_Jeju/Docs/S2-082099.zip).

Nokia, Nokia Siemens Networks, "Interworking aspects for loose NW control for service continuity between LTE and CDMA2000 systems", R2-073115, 3GPP TSG-RAN WG2, 2007, http://www.3gpp.org/ftp/tsg_ran/WG2_RL2/TSGR2_59/Docs/R2-073115.zip).

Extended Search Report issued Jan. 25, 2013 in European Patent Application No. 11185813.0.

3GPP TSG-SA2 Meeting#71, $3^{rd}$ Generation Partnership Project (3GPP), 3GPP Draft; S2-091495 WAS 159 CSFB-EXT SRV01, XP050333810, Feb. 18, 2009, 15 pages.

NTT DoCoMo, "CS Fallback Procedure", Agenda item 4.1, 3GPP Draft; R2-082962 CSFB Procedure, $3^{rd}$ Generation Partnership Project (3GPP), vol. RAN WG2, Jun. 2, 2008, XP050142148, pp. 1-13.

Telecom Italia, NTT DoCoMo, "Service and subscriber based inter-RAT mobility scenarios" Agenda item 4.4.4, 3GPP Draft; R2-074468, 3rd Generation Partnership Project (3GPP), vol. RAN WG2, XP050137013, Oct. 2007, 2 pages.

Chinese Office Action issued Sep. 5, 2014, in China Patent Application No. 201110334847.X (with English translation).

Chinese Office Action issued Feb. 25, 2015, in Chinese Patent Application No. 201110334847.X (with English Translation).

Chinese Office Action issued Jun. 6, 2015 in Chinese Patent Application No. 201110334847.X with English translation, 14 pages.

Office Action issued May 7, 2015 in European Patent Application No. 11 185 813.0.

European Office Action dated Oct. 26, 2015, issued in European Patent Application No. 11185813.0.

Chinese Office Action dated Dec. 31, 2015, issued in Chinese Patent Application No. 201110334847.X (with English translation).

\* cited by examiner

RADIO BASE STATION AND METHOD

BACKGROUND OF THE INVENTION

1. Field of the Invention

The present invention relates to mobile communication systems.

2. Description of the Related Art

In this type of technical field, schemes of present and future mobile communication systems are being prepared one after another by the Third Generation Partnership Project (3GPP). In particular, as for what is to succeed a wideband code division multiple access (W-CDMA) UTRA or UTRAN system, there is a scheme called E-UTRA (Evolved Universal Terrestrial Radio Access) or E-UTRAN (Evolved Universal Terrestrial Radio Access Network). The scheme using the E-UTRA or the E-UTRAN is also called Long Term Evolution (LTE).

Therefore, various mobile communication systems co-exist at this time, and various services are provided in each of the systems. Thus, one type of service, which is provided in a certain system, may not be provided in a different system. For example, assume that a Third Generation system such as W-CDMA, CDMA2000, UMTS, or GSM, and an LTE system co-exist in the same geographical area; and the LTE system is not providing a voice service for a time period at the beginning of introduction of the system. (During the period, the LTE system is dedicated to conducting data communication.) In this case, the voice service, which is provided in the Third Generation system, is not provided in the LTE system. When a user of the LTE system desires the voice service, the user needs to communicate in the Third Generation system. When the user is visiting the LTE system, the user must be able to communicate in the Third Generation system. A scheme to make it possible to allow the user visiting the LTE system to communicate in the Third Generation system and to provide the voice service is called CSFB (Circuit Switching Fall Back), which is disclosed in Non-patent document 1, for example:

NON-PATENT DOCUMENT

Non-patent document 1 3GPP TS23.272 V10.0.0 (2010-06), Sections 6.3 and 6.4

As described above, when a service is not provided in a first system, but is provided in a second system, it is made possible to provide the service to a user of the first system by handing over to the second system. When conducting a handover between systems, a radio base station of the first system normally instructs a mobile station to establish a radio access bearer and to measure a radio signal quality of a system to handover to; the mobile station establishes the radio access bearer, measures the radio signal quality of the system to handover to and reports a measured value; and then the radio base station requests a switching station for the handover. The switching station requests of the radio base station that the mobile station be handed over to the second system. However, when most of radio resources are allocated in the radio base station, a radio access bearer may not be established between the mobile station and the radio base station. When the radio access bearer cannot be established, the subsequent procedure cannot be executed, so that the mobile station cannot be handed over to the second system. As the mobile station cannot be handed over to the second system, the service provided by the second system cannot be provided to the mobile station.

SUMMARY OF THE INVENTION

The object of the present invention, which is aimed at solving the above described problems, is to provide a service provided in a second system to a mobile station in a camping status in a first system when the mobile station requests a service which is not provided in the first system and which is provided in the second system.

According to the present invention, a radio base station in a first mobile communication system is provided, including:

a radio communication unit which wirelessly communicates with a mobile station which can communicate in the first mobile communication system and in a second mobile communication system;

a network communication unit which communicates with a switching station; and a determining unit which determines whether the mobile station can be handed over to the second mobile communication system, wherein, if a massage received by the network communication unit from the switching station indicates that the mobile station is requesting a service which is not provided in the first mobile communication system but which is provided in the second mobile communication system and it is determined by the determining unit that a handover to the second mobile communication system cannot be conducted, the network communication unit requests the switching station to release a connection with the mobile station, and wherein the radio communication unit reports to the mobile station that the connection should be released in accordance with an instruction from the switching station.

According to the present invention, a method in a radio base station in a first mobile communication system is provided, including the steps of:

determining whether a handover to a second mobile communication system can be conducted when a massage received by the radio base station indicates that a mobile station is requesting a service which is not provided in the first mobile communication system but which is provided in the second mobile communication system;

requesting a switching station to release a connection with the mobile station when it is determined that the handover to the second mobile communication system cannot be conducted; and reporting to the mobile station that the connection should be released in accordance with an instruction from the switching station.

The disclosed radio base station and method make it possible to provide a service provided in a second system to a mobile station in a camping status in a first system when the mobile station requests a service which is not provided in the first system but is provided in the second system.

Other objects and further features of the present invention will be apparent from the following detailed description when read in conjunction with the accompanying drawings.

DETAILED DESCRIPTION OF PREFERRED EMBODIMENTS

Next, modes for carrying out the invention are described based on the following embodiments with reference to the drawings.

Throughout the drawings for explaining the embodiments, same letters are used for those elements having the same functions, so that repetitive explanations are omitted.

Embodiment

Mobile Communication System

An environment in which is applied a mobile communication system according to an embodiment of the present invention is described.

The environment in which is applied the mobile communication system according to the embodiment of the present invention is such that a first mobile communication system and a second mobile communication system geographically overlap at least partially. Assume that the first mobile communication system is an LTE system. Assume that the second mobile communication system is a Third Generation system such as a UTRA scheme, for example. However, the system to which the embodiment of the present invention may be applied is not limited to the LTE and UTRA systems, so that it may be a different system. For example, the present invention is also applicable to a system of GERAN (GSM), CDMA2000, or UMTS, or a Fourth Generation mobile communication system. The present invention is applicable in a situation such that a certain service is provided in one system and not in another system.

Figure 1:
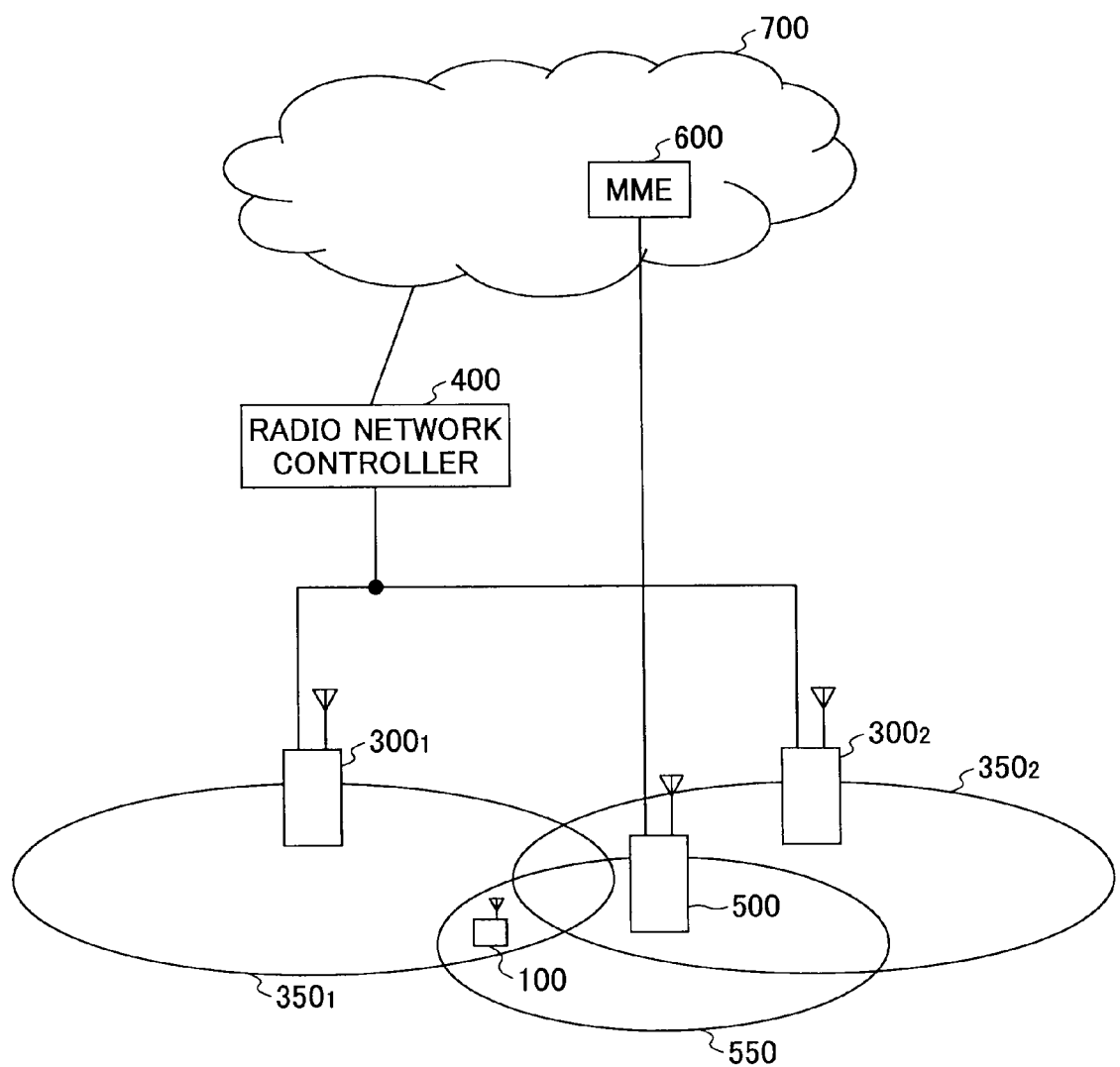
FIG. 1 is an explanatory diagram illustrating one example of an environment in which is applied a radio base station according to an embodiment of the present invention.

FIG. 1 shows an example of an environment in which co-exist a first mobile communication system and a second mobile communication system.

The first mobile communication system includes a mobile station 100, an LTE radio base station 500, and an MME 600.

The LTE radio base station 500 is connected to the MME 600 which is included in a core network 700. An area covered by the LTE radio base station 500 may include one or multiple cells 550. Within the multiple cells, there may be cells which allow radio communication in the same frequency band. The cells in which radio communication in the same frequency are possible may be called a frequency layer. The mobile station 100 conducts radio communication with the LTE radio base station 500 in the cell 550 using Evolved UTRA and UTRAN schemes.

Assume that, in the first mobile communication system (LTE), a voice service is not provided during a certain period at the beginning of introduction of the system. During this period, the first mobile communication system (LTE) is dedicated to conducting data communication, for example. In this case, the voice service, which is provided in the second mobile communication system (3G), is not provided in the first mobile communication system. Therefore, when a user of the first mobile communication system (LTE) desires the voice service, the user needs to communicate in the second mobile communication system (3G). Therefore, the user visiting the first mobile communication system (LTE) needs to be able to communicate in the second mobile communication system (3G), by allowing the voice services to be provided to the user.

The LTE mobile base station (eNB) 500 executes an operation in the first mobile communication system (LTE). The LTE radio base station 500 may also be referred to as an access point AP. The LTE radio base station (eNB) 500 may execute a process not only in the first mobile communication system (LTE), but also in the second mobile communication system (3G). The LTE radio base station (eNB) 500 in the first mobile communication system (LTE) conducts radio resources management, IP header compression and encryption and user plain data routing, scheduling of broadcast information, paging messages, etc.

The MME 600 is coupled to the LTE radio base station (eNB) 500 via an S1 interface. The MME 600 may be realized by a switching station. The MME 600 conducts management of mobility of the mobile station 100. More specifically, it conducts processes related to mobility management between 3GPP access networks, management of tracking area (location registration area) lists, selection of a gateway (GW) of a packet data network (PDN), selection of a serving gateway (GW), selection of a switching station (MME) in handover, roaming, authentication, radio access bearer management, subscriber information management, mobility management, outgoing and incoming calls control, charging control, QoS control, etc.

One mobile station is shown in FIG. 1, but there may be two or more mobile stations. Moreover, one LTE radio base station 500 connected to the MME 600 is shown in FIG. 1, but there may be two or more. Furthermore, one MME 600 is drawn in FIG. 1, but there may be two or more.

The second mobile communication system (3G) includes a mobile station 100, UTRA radio base stations $300_n$ ($300_1$, $300_2$), and a radio network controller 400.

The UTRA radio base stations $300_n$ are connected to the radio network controller 400, while the radio network controller 400 is connected to the core network 700. The UTRA radio base stations $300_n$ cover cells $350_n$. The mobile station 100 conducts radio communication with the UTRA radio base stations $300_n$ in the cells $350_n$ using a UTRA scheme. The UTRA radio base stations $300_n$ may also be referred to as access points APs.

One mobile station 100 is shown in FIG. 1, but there may be two or more. Moreover, two UTRA radio base stations 300 ($300_1$, $300_2$) connected to the radio network controller 400 are shown in FIG, 1, but there may be one or three. Furthermore, one radio network controller 400 is shown in FIG. 1, but there may be two or more.

Moreover, cells may co-exist in which radio communication are possible using a radio access technology which is different from the LTE and UTRA schemes. The different radio access technologies may include GERAN (GSM) and CDMA2000. Moreover, a Fourth Generation communication system may be included. The Fourth Generation mobile communication system may include LTE Advanced.

The mobile station 100 which may conduct radio communication with the LTE radio base station 500 may also conduct radio communication with the UTRA radio base stations $300_n$. In other words, the mobile station 100 is a dual mode terminal. The dual mode terminal may communicate using an existing mobile communication system (the UTRA scheme, for example) and a mobile communication to be newly introduced (the LTE scheme, for example). Not only the mobile station 100, but also a communication apparatus having a radio communication function, such as an information terminal, a notebook PC, or a portable digital assistant (PDA) may be included.

The LTE radio base station 500 according to an embodiment of the present invention determines whether the visiting mobile station 100 is provided with a handover function. For example, the LTE radio base station 500 may be arranged such that it determines whether the visiting mobile station 100 is provided with the handover function based on information which identifies terminal capabilities (terminal-capability identifying information). For example, the LTE radio base station 500 may be arranged such that it determines whether the visiting mobile station 100 is provided with the handover function based on information included in UE-EUTRA-Capability, which is reported by the mobile station 100 or the MME 600.

A user of the mobile station 100 in a camping status requests a voice service, which sets up an RRC Connection between the mobile station 100 and the LTE radio base station 500. A CSFB is started for the mobile station 100 in the camping status.

Based on results of determining whether the visiting mobile station is provided with the handover function, the LTE radio base station 500 of the present invention selects a CSFB procedure. For example, when it is determined that the visiting mobile station is provided with the handover function, the LTE radio base station 500 determines that it executes the CSFB procedure by an intersystem handover from the first mobile communication system to the second mobile communication system. Below, executing the CSFB procedure by the intersystem handover from the first mobile communication system to the second communication system is called "a CSFB procedure by a handover procedure".

Executing the CSFB procedure by the handover procedure makes it possible to shorten the time from when the CSFB is requested to when the second mobile communication system is connected to, making it possible for the mobile station 100 to be quickly provided a service in the second system.

Moreover, when it is not determined that the handover function is provided, the LTE radio base station 500 of the present invention releases the connection with the mobile station 100, and determines that the CSFB procedure is executed by redirection in which the mobile station 100 is made to access the second system. Below, executing the CSFB procedure by redirecting from the first mobile communication system to the second mobile communication system is called "a CSFB procedure by redirection". With executing the CSFB procedure by the redirection, as the CSFB procedure by the redirection is a function which is essential for the mobile station, all of the mobile stations may execute the CSFB procedure by the redirection.

Even when it is determined that the CSFB procedure is to be executed by the handover procedure, the LTE radio base station 500 of the embodiment of the present invention switches to the CSFB procedure by the redirection when radio resources for a radio access bearer for the mobile station 100 cannot be secured. As the mobile station 100 is in the camping status, the radio access bearer is not established with the LTE radio base station 500. Thus, when the mobile station for which the CSFB procedure by the handover procedure is to be executed is in the camping state, the radio access bearer needs to be established. For example, in a situation such that most of radio resources of communication networks in the LTE radio communication system are being allocated, the radio resources for the radio access bearer for the mobile station 100 may not be secured.

For the mobile station 100 which is provided with the handover function, it is preferable to execute the CSFB procedure by the handover procedure since connection time may be shortened. However, in order to execute the CSFB procedure by the handover procedure, it is necessary to set up the radio access bearer for the mobile station 100. This is because it is specified that information on the radio access bearer which is set up with the mobile station 100 be reported to the MME 600. Unless the radio access bearer can be set up with the mobile station 100, reporting to the MME 600 is not possible, which leads to a call loss. In the embodiment of the present invention, when the radio resources for the radio access bearer for the mobile station 100 cannot be secured, it is possible to switch to the CSFB procedure by the redirection. The ability to switch to the CSFB procedure by the redirection makes it possible to eliminate the call loss, which is due to the inability to execute the CSFB procedure by the handover procedure. As a result, a success rate of the CSFB may be improved, so that cases of being able to provide the voice service may be increased.

CSFB procedure by handover procedure

Figure 2:
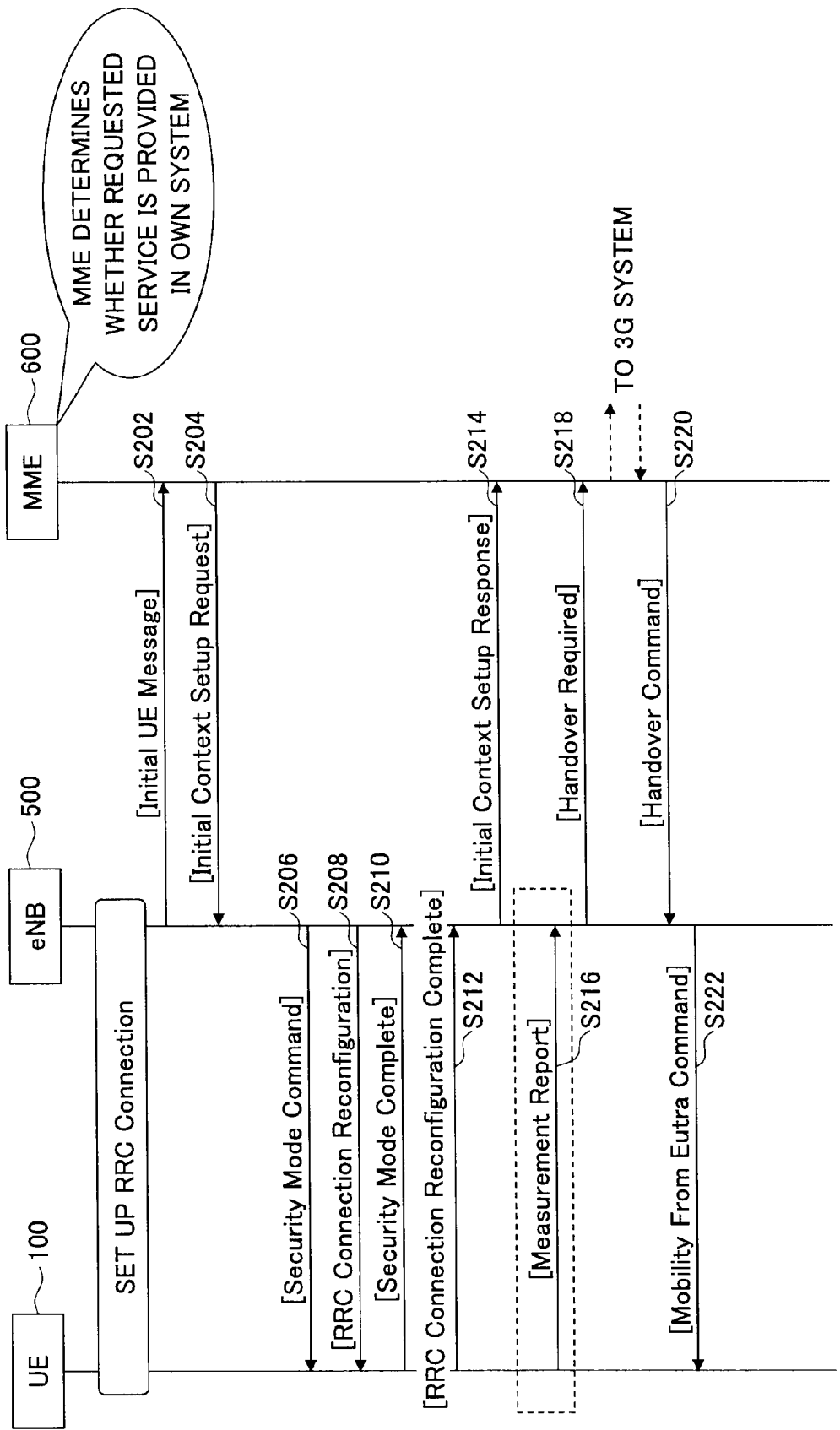
FIG. 2 is a sequence chart illustrating an example of a CSFB procedure by a handover procedure.

FIG. 2 is a sequence chart which shows the CSFB procedure by the handover procedure.

A user of the mobile station 100 in the camping status requests the voice service, which sets up an RRC Connection between the mobile station 100 and the LTE radio base station 500.

The LTE radio base station 500 transmits a connection setting request signal (an Initial UE Message) for a call connection (step S202).

The MME 600 transmits a connection setting instruction signal (an Initial Context Setup Request) to the LTE radio base station 500 in response to the connection setting request signal (step S204). The connection setting instruction signal includes a CSFB request.

The LTE radio base station 500 secures the radio resources for the radio access bearer for the mobile station 100 in response to the CSFB request included in the connection setting instruction signal. Then, the LTE radio base station 500 transmits a security authentication indicating signal (Security Mode Command) to the mobile station 100 (step S206). For example, the LTE radio base station 500 may be arranged such that, when it is determined that the mobile station 100 is provided with a handover function, it secures the radio resources for the radio access bearer for the mobile station 100 and transmits the security authentication indicating signal to the mobile station 100. This is because it is preferable that the CSFB procedure by the handover procedure is executed. The security authentication indicating signal includes key information, etc., which are used in encrypting of communication with the mobile station 100.

The LTE radio base station 500 transmits a connection setting and measurement indicating signal (RRC Connection Reconfiguration) (step S208). The connection setting and measurement indicating signal includes an indication for establishing the radio access bearer.

The mobile station 100 transmits a security authentication indication response signal (Security Mode Complete) to the LTE radio base station 500 in response to the security authentication indicating signal (step S210).

The mobile station 100 transmits a connection setting and measurement indication response signal (RRC Connection Reconfiguration Complete) in response to the connection setting and measurement indicating signal to the LTE radio base station (step S212).

The LTE radio base station 500 transmits a connection setting response signal (Initial Context Setup Response) to the MME 600 in response to the connection setting instruction signal (step S214). The connection setting response signal includes information on the radio access bearer established with the mobile station 100.

The mobile station 100 transmits a measurement result reporting signal (Measurement Report) to the LTE radio base station 500 (step S216). For example, the mobile station 100 reports measured values of radio signal quality in the second mobile communication system, which occurs in a cell of the first mobile communication system when there is no coverage of the second mobile communication system and may be omitted when there is coverage of the second mobile communication system.

The LTE radio base station 500 transmits a handover preparation request (Handover Required) to the MME 600 (step S218). For the handover preparation request, information on the radio access bearer which is established with the mobile station 100 is set. With the handover preparation request, the MME 600 sends an instruction, to the second mobile communication system (3G system), such that the mobile station 100 may handover from the first mobile communication system to the second mobile communication system.

In response to a response signal from the second mobile communication system to handover to, the MME 600 sends a handover preparation response (Handover Command) to the LTE radio base station 500 (step S220). For brevity of illustrations, exchange between the MME 600 and the second mobile communication system to handover to is not illustrated.

The LTE radio base station 500 transmits a handover indicating signal (Mobility from E-utra command) to the mobile station 100 in response to the handover preparation response (step S222). Subsequently (not shown), the mobile station 100 transmits an uplink signal to the second mobile communication system, conducts synchronization, and is handed over to the second mobile communication system. Then, after a connection is set up for a voice service in the second mobile communication system, implementation of the voice service to the mobile station 100 is started.

CSFB Procedure by Redirection

Figure 3:
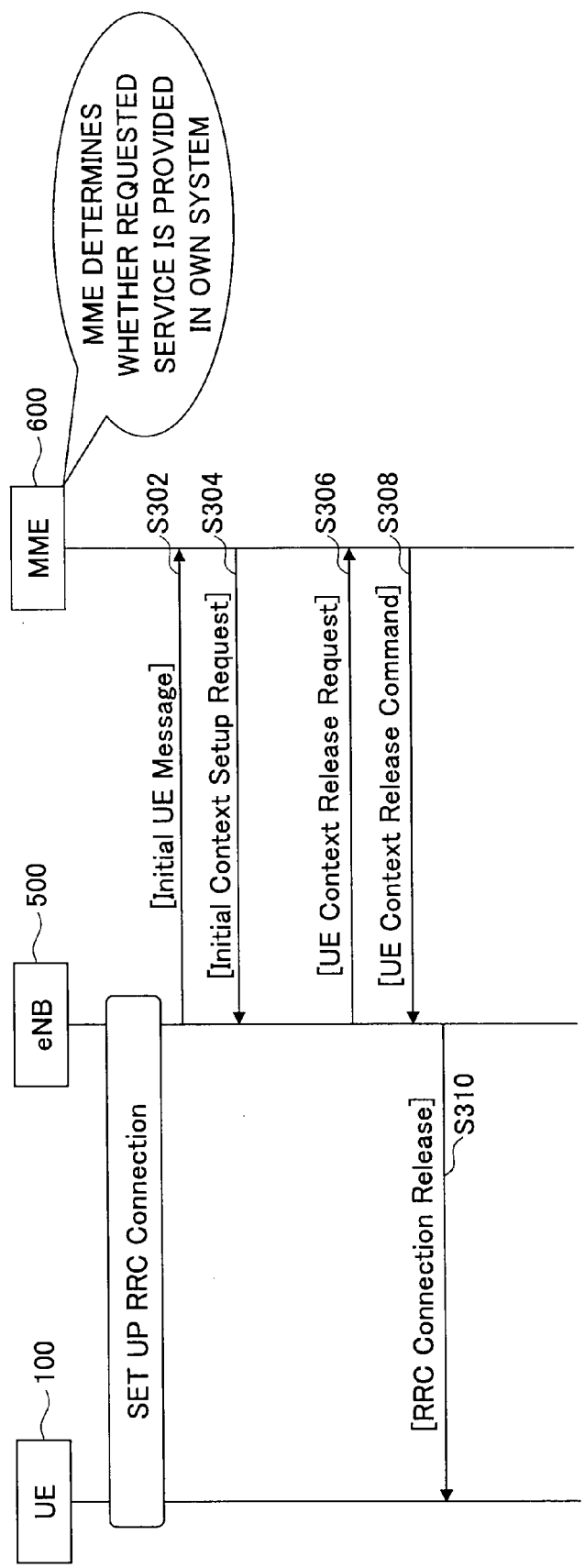
FIG. 3 is a sequence chart illustrating an example of the CSFB procedure by redirection.

FIG. 3 is a sequence chart which shows a CSFB procedure by redirection.

A user of the mobile station 100 in the camping status requests a voice service, which sets up an RRC Connection between the mobile station 100 and the LTE radio base station 500.

The LTE radio base station 500 transmits, to the MME 600, a connection setting request signal (Initial UE Message) for a call connection (step S302).

The MME 600 transmits a connection setting instruction signal (Initial Context Setup Request) to the LTE radio base station 500 in response to the connection setting request signal (step S304). The connection setting instruction signal includes the CSFB request.

In response to the CSFB request included in the connection setting instruction signal, the LTE radio base station 500 transmits a connection release request signal (UE Context Release Request) to the MME 600 (step S306). The connection release request signal is a control signal for redirection. For example, the LTE radio base station 500 may be arranged to transmit a connection release request signal to the MME 600 when it is determined that the mobile station 100 is not provided with a handover function. This is because the CSFB procedure by redirection is executed.

In response to the connection release request signal, the MME 600 performs a process for releasing radio resources allocated to the mobile station 100 in the first system. The MME 600 transmits a connection release instruction signal (UE Context Release Command) to the LTE radio base station 500 (step S308).

In response to the connection release instruction signal, the LTE radio base station 500 transmits a connection release instruction signal (RRC Connection Release) to the mobile station 100 (step S310). Subsequently (not shown), the mobile station 100 transmits an uplink signal to the second mobile communication system, conducts synchronization, and accesses the second mobile communication system. In this case, an operation by a user is not needed, so that the mobile station 100 automatically starts a connection procedure in response to instructions. Then, after a connection is set up for a voice service in the second mobile communication system, implementation of the voice service to the mobile station is started.

Figure 4:
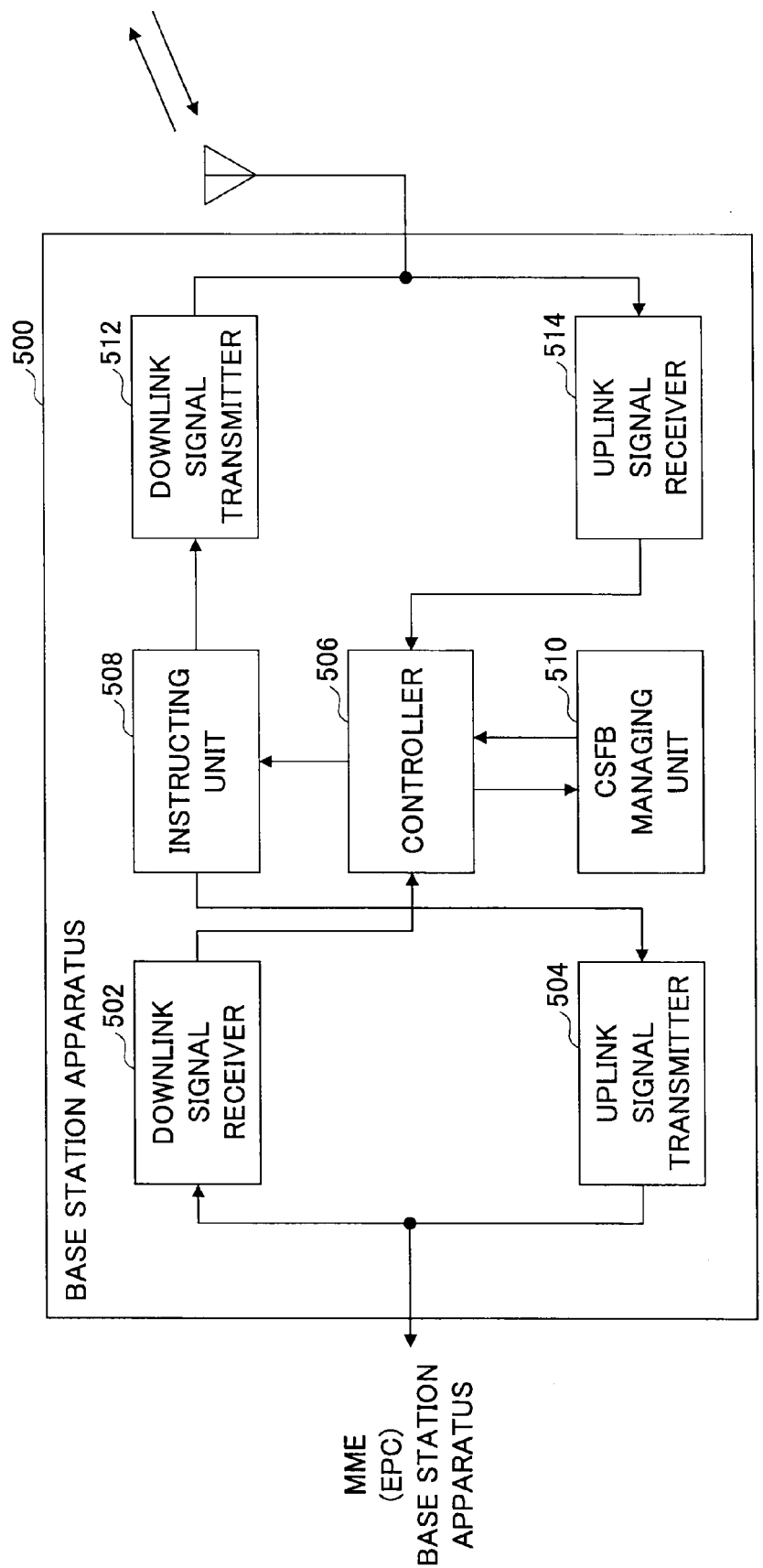
FIG. 4 is a functional block diagram illustrating the radio base station according to an embodiment of the present invention.

FIG. 4 shows an LTE radio base station 500 of the present invention.

The LTE radio base station 500 of the present invention has a downlink signal receiver 502. The downlink signal receiver 502 receives a downlink signal transmitted by an upper-layer apparatus, e.g., the MME 600. The downlink signal includes a connection setting instruction signal (Initial Context Setup Request), a handover preparation response (Handover Command), and a connection release instruction signal (UE Context Release Command). The downlink signal receiver 502 inputs the received downlink signal to the controller 506.

The LTE radio base station 500 of the present invention has an uplink signal receiver 514. The uplink signal receiver 514 receives a radio signal transmitted by the mobile station 100. The radio signal includes a security authentication indication response signal (Security Mode Complete), a connection setting and measurement indication response signal (RRC Connection Reconfiguration Complete), and a measured result reporting signal (Measurement Report).

The LTE radio base station 500 of the present invention includes a CSFB managing unit 510. The CSFB managing unit 510 is connected to the controller 506. The CSFB managing unit 510 manages information for causing the mobile station 100 to execute the CSFB procedure. The information may include information on the radio access bearer to be set up at the time of the CSFB procedure by the handover procedure.

The LTE radio base station 500 of the present invention includes the controller 506. The controller 506 is connected to the downlink signal receiver 502, the uplink signal receiver 514, an indicating unit 508, and the CSFB managing unit 510. The controller 506 determines whether the mobile station 100 for the CSFB procedure is provided with a handover function based on terminal capability identifying information to be input by the downlink signal receiver 502 and/or the uplink signal receiver 514. For example, the controller 506 determines whether the visiting mobile station 100 is provided with the handover function based on UE-EUTRA Capability.

Moreover, the controller 506 sets up a CSFB procedure to be applied depending on whether the visiting mobile station 100 is provided with the handover function. For example, the mobile station 100 which is provided with the handover function is caused to execute the CSFB procedure by the handover procedure. Moreover, the mobile station 100 which is not provided with the handover function is caused to execute the CSFB procedure by the redirection, for example.

Furthermore, the controller 506 performs a process for securing the radio resources for the radio access bearer for the mobile station 100 when the CSFB procedure by the handover procedure is executed. Moreover, when the radio resource for the radio access bearer for the mobile station 100 cannot be secured, the controller 506 switches to the CSFB procedure by the redirection.

For example, the controller 506 instructs the instructing unit 508 to transmit, to the mobile station 100, a security authentication indicating signal (Security Mode Command), a connection setting and measurement indicating signal (RRC Connection Reconfiguration), and a handover indicating signal (Mobility from E-UTRA command). Moreover, the controller 506, for example, instructs the instructing unit 508 to transmit, to the MME 600, a connection setting response signal (Initial Context Setup Response) and a handover preparation request (Handover Required) when executing the CSFB procedure by the handover procedure.

For example, when executing the CSFB procedure by the redirection, the controller 506 instructs the instructing unit 508 to transmit, to the MME 600, a connection release request signal (UE Context Release Request). Moreover, when executing the CSFB procedure by the redirection, the controller 506 instructs the instructing unit 508 to transmit, to the mobile station 100, a connection release instruction signal (RRC connection release), for example.

The LTE radio base station 500 of the present invention includes the instructing unit 508. The instructing unit 508 is connected to the controller 506, a downlink signal transmitter 512, and an uplink signal transmitter 504.

The instructing unit 508 instructs to transmit an uplink signal in accordance with a command by the controller 506. For example, in accordance with the command from the controller 506, the instructing unit 508 instructs the uplink signal transmitter 504 to transmit an uplink signal to the MME 600.

Moreover, the instructing unit 508 instructs to transmit a downlink signal in accordance with a command by the controller 506. For example, in accordance with a command by the controller 506, the instructing unit 508 instructs the downlink signal transmitter 512 to transmit a downlink signal to the mobile station 100.

The LTE radio base station 500 of the present invention has the uplink signal transmitter 504. The uplink signal transmitter 504 is connected to the instructing unit 508. In accordance with an instruction by the instructing unit 508, the uplink signal transmitter 504 transmits an uplink signal.

The LTE radio base station 500 of the present invention has the downlink signal transmitter 512. The downlink signal transmitter 512 is connected to the instructing unit 508. In accordance with an instruction by the instructing unit 508, the downlink signal transmitter 512 transmits a downlink signal.

Functions of LTE Radio Base Station

Figure 5:
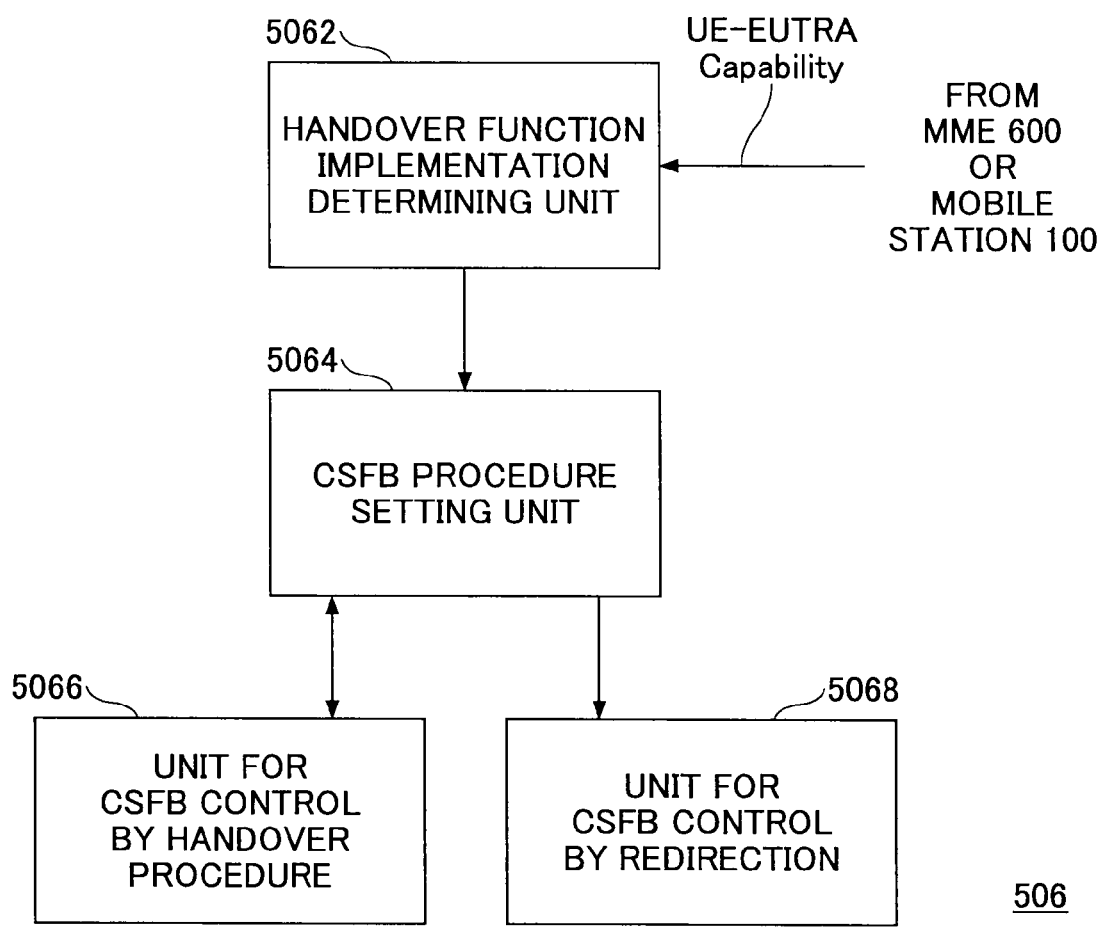
FIG. 5 is a functional block diagram illustrating the radio base station according to an embodiment of the present invention.

FIG. 5 shows functions of an LTE radio base station of the present invention. FIG. 5 mainly shows functions of the controller 506.

The controller 506 includes a handover function implementation determining unit 5062. The handover function implementation determining unit 5062 may be arranged to determine whether the visiting mobile station 100 is provided with a handover function based on terminal capability identifying information to be reported by the MME 600 and/or the mobile station 100. For example, UE-EUTRA-Capability, which is reported by the MME 600 from the downlink signal receiver 502, and/or UE-EUTRA-Capability, which is reported by the mobile station 100 from the uplink signal receiver 514 are input to the handover function implementation determining unit 5062. The handover function implementation determining unit 5062 may determine whether the visiting mobile station 100 is provided with a handover function based on information included in UE-EUTRA-Capability. The handover function implementation determining unit 5062 inputs, into a CSFB procedure setting unit 5064, results of determining whether the mobile station 100 is provided with the handover function.

The controller 506 includes the CSFB procedure setting unit 5064. The CSFB procedure setting unit 5064 is connected to the handover function implementation determining unit 5062. Based on the results of determining whether the mobile station 100 is provided with the handover function, which results are input by the handover function implementation determining unit 5062, the CSFB procedure setting unit 5064 determines whether to cause the mobile station 100 to execute the CSFB procedure by the handover procedure. For example, when the mobile station 100 is provided with the handover function, the CSFB procedure setting unit 5064 determines that the CSFB procedure by the handover procedure is to be executed. If it is determined that the CSFB procedure by the handover procedure is to be executed, the CSFB procedure setting unit 5064 instructs a unit 5066 for controlling CSFB by the handover procedure to execute the CSFB procedure by the handover procedure. Moreover, if it is determined that the CSFB procedure by the handover procedure is not to be executed, the CSFB procedure setting unit 5064 instructs a unit 5068 for controlling CSFB by the redirection to execute the CSFB procedure by the redirection.

The controller 506 includes the unit 5066 for controlling CSFB by handover procedure. In accordance with a command by the CSFB procedure setting unit 5064, the unit 5066 for controlling CSFB by handover procedure conducts control for executing the CSFB procedure by the handover procedure. For example, a process is executed which secures radio resources for a radio access bearer for the mobile station 100. If the radio resources for the radio access bearer for the mobile station 100 can be secured, the CSFB procedure by the handover procedure is continued. If the resources for the radio access bearer for the mobile station 100 cannot be secured, it is reported to the CSFB procedure setting unit 5064 that the CSFB procedure by the handover procedure cannot be executed.

When it is reported, from the unit 5066 for controlling CSFB by handover procedure that the CSFB procedure by the handover procedure cannot be executed, the CSFB procedure setting unit 5064 instructs the unit 5068 for controlling CSFB by redirection to execute the CSFB procedure by the redirection.

The controller 506 includes the unit 5068 for controlling CSFB by redirection. In accordance with a command by the CSFB procedure setting unit 5064, control is conducted for executing the CSFB procedure by the redirection.

Operations of mobile communication system

Figure 6:
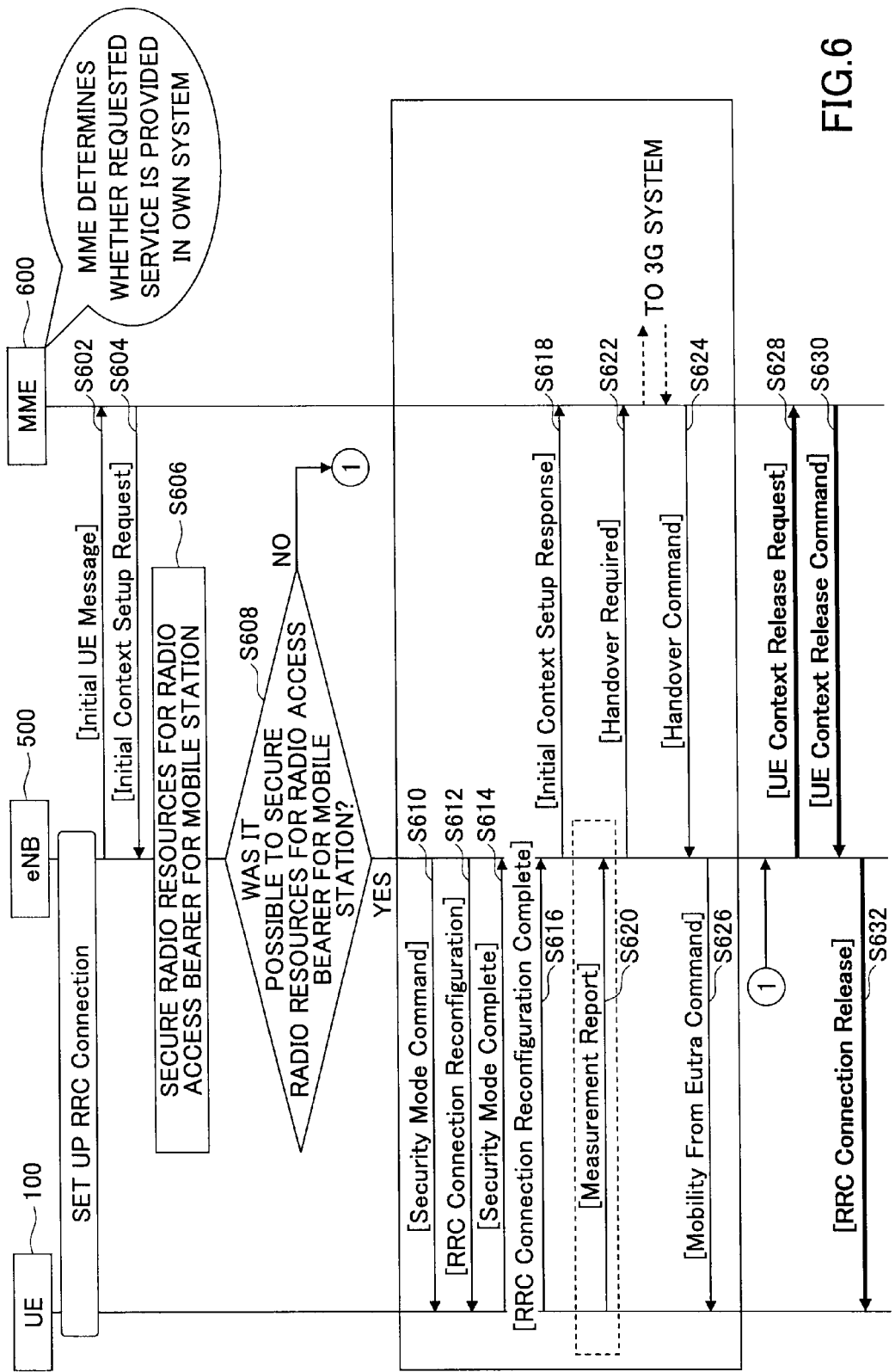
FIG. 6 is a sequence chart for explaining an operation of a mobile communication system according to an embodiment of the present invention.

FIG. 6 is a sequence chart for showing operations of a mobile communication system of the present invention.

In the mobile station 100, which is provided with a handover function, a CSFB procedure by a handover procedure is executed.

A user of the mobile station 100 in a camping status requests a voice service, which sets up an RRC Connection between the mobile station 100 and the LTE radio base station 500.

The LTE radio base station 500 transmits, to the MME 600, a connection setting request signal (Initial UE Message) for a call connection (step S602). For example, the controller 506 instructs the instructing unit 508 to transmit a connection setting request signal to the MME 600. The instructing unit 508 transmits a connection setting request signal from the uplink signal transmitter 504 to the MME 600.

The MME 600 transmits a connection setting instruction signal (Initial Context Setup Request) to the LTE radio base station 500 in response to the connection setting request signal (step S604). The connection setting instruction signal includes the CSFB request. For example, the connection setting instruction signal, which is received by the downlink signal receiver 502, is input into the controller 506.

In accordance with the CSFB request from the MME 600, the LTE radio base station 500 of the present invention conducts a process for securing radio resources for a radio access bearer (step S606). For example, the unit 5066 for controlling CSFB by handover procedure conducts a process for securing resources for the radio access bearer for the mobile station 100.

The LTE radio base station 500 of the present invention determines whether it was possible to secure resources for the radio access bearer for the mobile station 100 (step S608). For example, the unit 5066 for controlling CSFB by handover procedure determines whether it is possible to secure radio resources for the radio access bearer for the mobile station 100 (step S608).

If it is determined that it was possible to secure the radio resources for the radio access bearer for the mobile station 100 (step S608; YES), the radio base station 500 of the present invention executes the CSFB procedure by the handover procedure. For example, the unit 5066 for controlling CSFB by handover procedure continues the CSFB procedure by the handover procedure if it is possible to secure the radio resources for the radio access bearer for the mobile station 100. The CSFB procedure by the handover procedure shown in FIG. 6 (Steps S601-S626) is similar to steps S206-S222, which are described above with reference to FIG. 2.

On the other hand, if it is determined that it is not possible to secure the radio resources for the radio access bearer for the mobile station 100 (step S608: NO), the radio base station 500 of the present invention executes the CSFB procedure by the redirection procedure. For example, if it is not possible to secure the radio resources for the radio access bearer for the mobile station 100, the unit 5066 for controlling CSFB by handover procedure reports, to the CSFB procedure setting unit 5064, that the CSFB procedure by the handover procedure cannot be executed. When it is reported, from the unit 5066 for controlling CSFB by handover procedure that the CSFB procedure by the handover procedure cannot be executed, the CSFB procedure setting unit 5064 instructs the unit 5068 for controlling CSFB by redirection to execute the CSFB procedure by the redirection. In accordance with the setting by the CSFB procedure setting unit 5064, the unit 5068 for controlling CSFB by redirection conducts control such that the CSFB procedure by the redirection is executed. The CSFB procedure by the redirection shown in FIG. 6 (Steps S628-S632) is similar to steps S306-310, which are described above with reference to FIG. 3.

Taking into account only a success rate of the CSFB, it suffices to uniformly execute the CSFB procedure by redirection regardless of whether the mobile station is provided with a handover function. However, if a time from when the CSFB procedure is executed to when a voice service is provided is taken into account, it is preferable to use both the CSFB by the handover procedure and the CSFB by the redirection.

In the above embodiment, an example has been shown which switches from the CSFB by the handover procedure to the CSFB by the redirection if it is not possible to secure the radio resources for the radio access bearer. However, examples are not limited to the above-described example, so that the present invention is applicable to a case such that the CSFB process by the handover procedure cannot be continued due to various factors. For example, when most of radio resources are not allocated, but apparatus load is high, it may be arranged to switch to the CSFB by the redirection. More specifically, it may be arranged to switch to the CSFB by the redirection when the CPU load of the LTE radio base station is high (when the CPU load is not below a certain threshold). Moreover, it may be arranged to switch to the CSFB by the redirection when a security authentication instruction response signal (Security Mode Complete) to be transmitted from a mobile station in response to a security authentication instruction signal (Security Mode Command).

While an example such that a voice service is provided has been explained in the above embodiment, the present invention is not limited to a specific service. For example, in lieu of or in addition to the voice service, a location measurement service which measures a location of a mobile station (UE) using, e.g., GPS; an emergency information delivery ("Area mail"); or a short message service may be used, for example.

While an example of a handover from an LTE system to a 3G system has been explained, a handover in the reverse direction may be conducted. At an outset of introduction of the LTE system, the 3G system may be more advantageous in being able to provide a variety of services. However, as the LTE system becomes popular, it will be able to provide more enhanced services than the 3G system. In such a case, it is possible that a user visiting the 3G system hands over to the LTE system to seek services not provided in the 3G system.

According to embodiments of the present invention, a radio base station in a first mobile communication system is provided, including:

a radio communication unit which wirelessly communicates with a mobile station which can communicate in the first mobile communication system and in a second mobile communication system;

a network communication unit which communicates with a switching station; and a determining unit which determines whether the mobile station can be handed over to the second mobile communication system, wherein, if a massage received by the network communication unit from the switching station indicates that the mobile station is requesting a service which is not provided in the first mobile communication system but which is provided in the second mobile communication system and it is determined by the determining unit that a handover to the second mobile communication system cannot be conducted, the network communication unit requests the switching station to release a connection with the mobile station, and wherein the radio communication unit reports to the mobile station that the connection should be released in accordance with an instruction from the switching station.

Moreover, the determining unit determines that the handover to the second mobile communication system cannot be conducted when a radio resource for a radio access bearer for the mobile station cannot be secured.

Furthermore, the determining unit determines that the handover to the second mobile communication system cannot be conducted when an apparatus load is no less than a predetermined threshold.

Moreover, the determining unit determines that the handover to the second mobile communication system cannot be conducted when a response from the mobile station indicates a failure.

Furthermore, the service is a voice service.

Moreover, the service is a location measurement service.

Furthermore, the service is an emergency information delivery service.

Moreover, the service is a short message service.

According to embodiments of the present invention, a method in a radio base station in a first mobile communication system is provided, including the steps of:

determining whether a handover to a second mobile communication system can be conducted when a massage received by the radio base station indicates that a mobile station is requesting a service which is not provided in the first mobile communication system but which is provided in the second mobile communication system;

requesting a switching station to release a connection with the mobile station when it is determined that the handover to the second mobile communication system cannot be conducted; and reporting to the mobile station that the connection should be released in accordance with an instruction from the switching station.

As described above, while the present invention is described with reference to specific embodiments, the respective embodiments are merely examples, so that a skilled person will understand variations, modifications, alternatives, replacements, etc. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present application is based on Japanese Priority Patent Application No. 2010-244078 filed on Oct. 29, 2010, with the Japanese Patent Office, the entire contents of which are hereby incorporated herein by reference.

What is claimed is:

1. A radio base station in a first mobile communication system, comprising:
    a radio communication interface configured to wirelessly communicate with a mobile station which can communicate in the first mobile communication system and in a second mobile communication system;
    a network communication interface configured to be in communication with a switching station; and
    circuitry configured to:
        determine whether the mobile station is provided with a handover function based on capability information provided by mobile station;
        determine whether a radio resource for a radio access bearer can be established between the radio base station and the mobile station when it is determined that the mobile station is provided with the handover function;
        determine that the mobile station is unable to be handed over to the second mobile communication system when it is determined that an apparatus load is no less than a predetermined threshold;
        determine that the mobile station is unable to handover to the second communication system when it is determined that the mobile station is not provided with the handover function or when it is determined that the radio resource for the radio access bearer cannot be established; and
        determine that mobile station is capable of handover to the second mobile communication system when it is determined that the mobile station is provided with the handover function and that the radio resource for the radio access bearer can be established between the radio base station and the mobile station, wherein
    the network communication interface is configured to
        receive a message from the switching station;
        send a request to the switching station to release a connection with the mobile station in order to conduct a redirection procedure when the message from the switching station indicates that the mobile station is requesting a service which is not provided in the first mobile communication system but which is provided in the second mobile communication system, and it is determined that the mobile station is provided with the handover function, that the radio resource for the radio access bearer cannot be established between the radio base station and the mobile station, and that the mobile station is unable to be handed over to the second mobile communication system;
        report to the mobile station that the connection should be released in accordance with an instruction from the switching station; and
        transmit an instruction to the mobile station to handover when the circuitry determines that mobile station is capable of handover to the second mobile communication system.

2. The radio base station as claimed in claim 1, wherein the circuitry is configured to determine that the mobile station is unable to be handed over to the second mobile communication system when it is determined that a response from the mobile station indicates a failure.

3. The radio base station as claimed in claim 1, wherein the service is a voice service.

4. The radio base station as claimed in claim 1, wherein the service is a location measurement service.

5. The radio base station as claimed in claim 1, wherein the service is an emergency information delivery service.

6. The radio base station as claimed in claim 1, wherein the service is a short message service.

7. A method in a radio base station in a first mobile communication system, comprising:
    determining whether a mobile station in the first mobile communication system is provided with a handover function based on capability information provided by the mobile station;
    determining whether a radio resource for a radio access bearer can be established between the radio base station and the mobile station when it is determined that the mobile station is provided with the handover function;
    determining that the mobile station is unable to be handed over to the second mobile communication system when it is determined that an apparatus load is no less than a predetermined threshold;
    determining that the mobile station is unable to handover to a second communication system when it is determined that the mobile station is not provided with a handover function or when it is determined that the radio resource for the radio access bearer cannot be established;
    determine that the mobile station is capable of handover to the second mobile communication system when it is determined that the mobile station is provided with the handover function and that the radio resource for the radio access bearer can be established between the radio base station and the mobile station;
    receiving a message from a switching station;
    sending a request to the switching station to release a connection with the mobile station in order to conduct a redirection procedure when the message from the switching station indicates that the mobile station is requesting a service which is not provided in the first mobile communication system but which is provided in the second mobile communication system, and it is determined that the mobile station is provided with the handover function, that the radio resource for the radio access bearer cannot be established between the radio base station and the mobile station, and that the mobile station is unable to be handed over to the second mobile communication system;

reporting to the mobile station that the connection should be released in accordance with an instruction from the switching station; and transmitting an instruction to the mobile station to handover when it is determined that the mobile station is capable of handover to the second mobile communication system.

* * * * *